United States Patent
Dunn et al.

(10) Patent No.: US 8,749,079 B1
(45) Date of Patent: Jun. 10, 2014

(54) INTEGRATED WANKEL EXPANDER-ALTERNATOR

(75) Inventors: Paul M. Dunn, West Kingston, RI (US); Christopher J. Egan, South Kingston, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 739 days.

(21) Appl. No.: 13/078,261

(22) Filed: Apr. 1, 2011

(51) Int. Cl.
  *F02B 63/04* (2006.01)
  *F01C 19/00* (2006.01)
  *H02K 1/22* (2006.01)

(52) U.S. Cl.
  USPC ............... 290/1 R; 418/61.2; 310/216.053

(58) Field of Classification Search
  CPC ........ F02B 63/04; F02B 75/16; F02B 63/048; F02H 2063/045; H02K 7/1815
  USPC ............ 290/1 A, 1 R; 418/141, 113, 61.2; 210/268, 216.053; 123/202
  See application file for complete search history.

(56) References Cited

U.S. PATENT DOCUMENTS

| | | | |
|---|---|---|---|
| 2,988,008 A | 6/1961 | Wankel | |
| 3,193,189 A * | 7/1965 | Rastogi | 418/61.2 |
| 3,446,190 A * | 5/1969 | Bensinger Wolf-Dieter et al. | 123/202 |
| 3,860,366 A * | 1/1975 | Haglund et al. | 418/61.2 |
| 3,863,353 A * | 2/1975 | Saari | 33/542 |
| 3,990,817 A * | 11/1976 | Ruf et al. | 418/61.2 |
| 3,994,266 A * | 11/1976 | Jones | 123/205 |
| 4,018,548 A * | 4/1977 | Berkowitz | 418/61.2 |
| 4,389,172 A * | 6/1983 | Griffith | 418/61.2 |
| 4,395,206 A * | 7/1983 | Hoffmann | 418/61.2 |
| 4,960,082 A | 10/1990 | Sullivan | |
| 5,168,846 A * | 12/1992 | Paul et al. | 123/202 |
| 5,343,704 A | 9/1994 | Kanzaki | |
| 6,520,754 B2 * | 2/2003 | Randolphi | 417/420 |
| 8,004,133 B2 * | 8/2011 | Wilson, II | 310/83 |

* cited by examiner

*Primary Examiner* — Julio Gonzalez
(74) *Attorney, Agent, or Firm* — James M. Kasischke; Michael P. Stanley

(57) ABSTRACT

A compact Wankel expander-alternator combination is provided. The combination includes a stationary outer housing that has embedded stator coils and a rotating inner housing having corresponding magnets disposed around the housing with the magnet/coil interaction generating power. Within the rotating housing, a three-sided rotor turns within a two lobed Wankel cavity, powered by working fluid acting on the rotor. The rotating housing and the rotor each circumscribe a stationary shaft. The shaft has an eccentric lobe about which the rotor turns on a bearing disposed between the rotor and the lobe. The rotating housing turns on bearings supported by the stationary shaft. The rotor and rotating housing are linked so that as the rotor turns in response to the working fluid force, the housing turns at a higher speed the speed ratio being preselected to achieve the desired output energy.

19 Claims, 1 Drawing Sheet

INTEGRATED WANKEL EXPANDER-ALTERNATOR

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The present invention relates to an integrated Wankel expander-alternator pairing and more particularly to an expander-alternator combination that is more compact than a traditional, shaft-coupled engine-alternator pairing. This inventive concept permits the energy generated to be employed in a smaller, typically unmanned, submersible known in the underwater vehicle art as an Unmanned Undersea Vehicle (UUV).

(2) Description of the Prior Art

It is well known in the UUV art that undersea vehicles that operate independent of air must either employ thermal engines that burn air-independent fuels, or use electric powered motors with the energy delivered by primary batteries, secondary batteries, fuel cells, or the like.

The operating range of UUV vehicles could be increased significantly if an air-breathing engine were used to recharge the batteries which is the charging method used by most non-nuclear submarines. In such submarines, a diesel engine drives a generator that charges the submarine batteries. The air-breathing engine technique has not yet found favor in UUV designs. This is due in major part to the diesel engine and the generator occupying a large amount of space and weight; thereby, leaving little room for fuel storage and batteries. This is also due in part to the acoustic noise signature emanations produced by such an equipped vehicle.

In view of the generally small size of a typical UUV body; what is needed for UUV applications is a compact air-independent electrical power-generating source that takes up a relatively small proportion of the overall space and weight of the vehicle or UUV.

SUMMARY OF THE INVENTION

Accordingly, it is a general purpose and primary object of the present invention to provide a compact air-independent energy-generating device based on rotating housing Wankel expander principals.

It is a further object of the present invention that the device employs a stationary outer housing having a plurality of embedded stator coils, the outer housing being paired with a rotating inner housing having a corresponding plurality of magnets disposed around the periphery of the rotating housing; thereby providing, in combination, an alternator for generating electrical power.

It is a still further object of the present invention that the resulting compact combination device be capable of being employed in smaller size and weight UUV designs, or used in present larger UUV designs to allow for greater fuel carrying capacity and corresponding longer mission capability.

The above described objects are accomplished in the present invention by including an integrated Wankel expander-alternator combination that is more compact than a traditional shaft coupled engine and alternator pairing. This combination type of energy generation pairing can therefore be used in smaller UUV submersibles. The expander-alternator device includes a stationary outer housing having a plurality of embedded stator coils paired with a rotating inner housing having a corresponding plurality of magnets disposed around the periphery of the rotating housing to provide, in combination, for the generation of power. Within the rotating housing a three-sided rotor turns within a typical two lobed Wankel cavity. The turning is powered by pressurized working fluid acting on the rotor. The rotating housing and the rotor each circumscribe a stationary and eccentric shaft.

The stationary shaft has an eccentric lobe section about which the rotor turns on a journal bearing disposed between the rotor and the eccentric lobe. The rotating housing turns on journal bearings resting on the stationary shaft. Gearing links the rotor and the rotating housing such that as the rotor turns in response to the force of the working fluid; the rotating housing turns at a higher speed with the speed ratio being preselected to achieve the desired output energy.

BRIEF DESCRIPTION OF THE DRAWING

A more complete understanding of the invention and many of the attendant advantages thereto will be readily appreciated as the same becomes better understood by reference to the following detailed description when considered in conjunction with the accompanying drawings wherein.

DETAILED DESCRIPTION OF THE INVENTION

The present invention makes use of a known Wankel expander device employing a rotating housing within a stationary housing.

Figure 1:
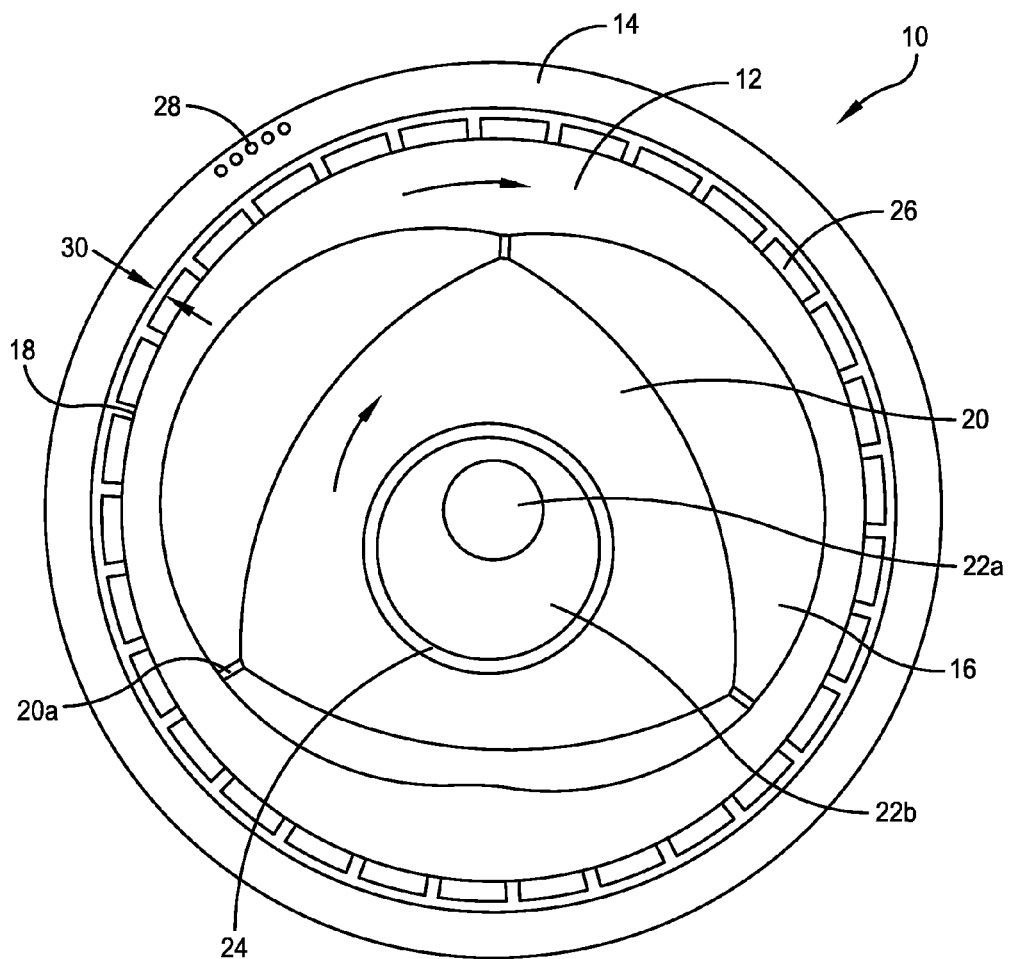
FIG. 1 depicts an integrated Wankel expander-alternator device built according to the teachings of the present invention.

Referring now to FIG. 1, there is generally depicted a Wankel expander-alternator 10 employing a rotating housing 12 (with a direction arrow indicating movement) disposed within a fixed outer housing/stator 14. The rotating Wankel expander housing 12 is configured with a standard two-lobed Wankel ellipsoid internal working fluid volume 16 and a cylindrical outer surface 18.

Within the internal volume 16 is disposed a three sided, three tipped Wankel rotor 20 having a tip seal 20a disposed at each tip. The rotor 20 rotates (at two-thirds of the speed of the expander housing 12) about a fixed shaft 22a that has an eccentric lobe 22b formed thereon. The rotor 20 rotates on a bearing 24 disposed about the lobe 22b between the rotor and the lobe, the rotor revolving through gearing (not shown) at a fraction of the rotational speed of the rotating housing 12. The fraction in the preferred embodiment is preselected as two-thirds. A plurality of permanent magnets 26 are affixed to the outer surface of the rotating housing 12 in an evenly—spaced relationship, the magnets rotating with the housing. The magnets 26 may be extended from the housing 12 or flush with the surface of the housing or recessed within the surface of the housing.

A plurality of multi-wire stator windings, an exemplary one of which is shown generally as item 28 in FIG. 1, are wound into the stationary alternator housing 14 in an appropriate electrical configuration to match the number of permanent magnets 26 selected thereby forming pole pairs. The stator windings 28 and magnets 26 interact to generate an induced electrical current upon rotation of the rotor housing 12.

The rotating magnets 26 and the stator windings 28 in the stationary housing 14 are separated by a controlled dimension air-gap 30 through which the magnetic flux passes. The rotating engine housing 12 or the engine's end plates [not shown] are configured with working fluid inlet and exhaust valve ports to control the sequence of working fluid flow to and from the working volume 16, and cooling channels [not shown] remove heat from the engine and generator. The stationary housing 14 can also be configured with cooling channels to enable heat removal from the stator.

Figure 2:
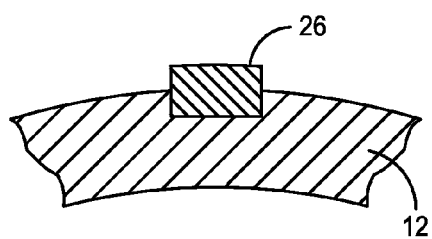
FIG. 2 depicts an alternate mounting configuration for the rotor housing-mounted magnets depicted in FIG. 1.

FIG. 2 depicts an alternative magnet mounting configuration where each of the plurality of magnets 26 are embedded in the outer wall of rotor housing 12 instead of being affixed to the outermost surface of the housing.

The advantages and new features of the present invention are: the thermal engine portion and the permanent magnet generator portion of the device are combined into a single integrated housed device 10 in contrast to the previous standard diesel-electric power plants that included separately housed engine and generator devices tied together on a common shaft. The integrated device 10 reduces size and weight and enables smaller, lighter designs for UUV applications. Furthermore, with the rotating housing Wankel configuration described above, all rotating elements of the engine and generator rotate about their own axis, providing very low vibratory motion.

What has thus been described is an integrated Wankel expander-alternator combination that is more compact than a traditional shaft coupled engine and alternator pairing thus permitting the use of this combination type of energy generation pairing in smaller UUV submersibles. The expander-alternator device includes a stationary outer housing having a plurality of embedded stator coils paired with a rotating inner housing having a corresponding plurality of magnets disposed around the periphery of the rotating housing to provide, in combination, for the generation of power. Within the rotating housing a three-sided rotor turns within a typical two lobed Wankel cavity, powered by working fluid acting on the rotor. The rotating housing and the rotor each circumscribe a stationary shaft. The stationary shaft has an eccentric lobe section about which the rotor spins on a journal bearing disposed between the rotor and the eccentric lobe. The rotating housing turns on journal bearings on the stationary shaft. Gearing links the rotor and the rotating housing such that as the rotor turns in response to the force of the working fluid, the rotating housing turns at a higher speed. The speed ratio is preselected to achieve the desired output energy.

Obviously many modifications and variations of the present invention may become apparent in light of the above teachings. For example: the engine portion of the engine-generator device can be configured as a spark-ignition internal combustion engine, a compression-ignition internal combustion engine, or an external combustion engine. The engine could be powered by either a mono-propellant or a bi-propellant fuel/oxidizer energy source. Also, the alternator portion of the device can be configured with either surface-mounted or embedded permanent magnets; the invention could make use of either straight or skewed magnets and straight or skewed stator slots; the pressurized working fluid can be a gas, steam or air; and the Wankel engine interior can be configured with variations of number of working volume lobes, i.e. 3 lobes or 4 lobes as desired.

In light of the above, it is therefore understood that within the scope of the appended claims, the invention may be practiced otherwise than as specifically described.

What is claimed is:

1. An integrated Wankel expander-alternator system comprising:
    a stationary shaft, having a central axis and an eccentric lobe formed about said shaft in an axially offset relationship to the central axis;
    a bearing disposed concentrically over said eccentric lobe, said bearing capable of providing a low friction rotatable surface about said eccentric lobe exterior;
    a multi-tipped rotor, in movable contact with said eccentric bearing, said rotor free to turn in a preselected manner about said shaft;
    a rotating housing, rotatable around said shaft and having a two-lobed ellipsoid interior volume enclosing said stationary shaft, said eccentric lobe, said bearing and said rotor thereby permitting a desired rotor movement within said lobes of said interior volume;
    a pressurized working fluid applied to the interior volume of said rotating housing, for providing a motive force to said rotor and/or said rotating housing therewithin;
    a plurality of permanent magnets, affixed about the periphery of said rotating housing outer surface at evenly spaced intervals, for providing one component of an alternator; and
    a stationary outer housing, having incorporated therein a plurality of stator coils, one coil each corresponding to said plurality of permanent magnets, for producing electrical power from the interaction of said rotating magnets and said stationary stator coils during rotation, said outer housing further surrounding all of said rotating housing, said magnets and said coils of said alternator.

2. The system of claim 1 wherein said alternator permanent magnets are further bonded onto a periphery surface of said rotating housing periphery and said multi-tip rotor has at least three equally spaced tips in moveable contact with said rotating housing volume.

3. The system of claim 1 wherein said permanent magnets are further embedded into a surface of said rotating housing periphery and said multi-tip rotor has three at least equally spaced tips in moveable contact with said rotating housing volume.

4. The system of claim 2 wherein said bearing is a journal bearing.

5. The system of claim 2 wherein said bearing is a roller bearing.

6. The system of claim 4 wherein said pressurized working fluid is a gas.

7. The system of claim 4 wherein said pressurized working fluid is steam.

8. The system of claim 4 wherein said pressurized working fluid is air.

9. The system of claim 5 wherein said pressurized working fluid is a gas.

10. The system of claim 5 wherein said pressurized working fluid is steam.

11. The system of claim 5 wherein said pressurized working fluid is air.

12. The system of claim 3 wherein said bearing is a journal bearing.

13. The system of claim 3 wherein said bearing is a roller bearing.

14. The system of claim 12 wherein said pressurized working fluid is a gas.

15. The system of claim 12 wherein said pressurized working fluid is steam.

16. The system of claim 12 wherein said pressurized working fluid is air.

17. The system of claim 13 wherein said pressurized working fluid is a gas.

18. The system of claim 13 wherein said pressurized working fluid is steam.

19. The system of claim 13 wherein said pressurized working fluid is air.

\* \* \* \* \*